(12) United States Patent
Natu

(10) Patent No.: US 7,240,187 B2
(45) Date of Patent: Jul. 3, 2007

(54) METHOD AND APPARATUS TO SUPPORT LEGACY MASTER BOOT RECORD (MBR) PARTITIONS

(75) Inventor: Mahesh S. Natu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 474 days.

(21) Appl. No.: 10/935,956

(22) Filed: Sep. 8, 2004

(65) Prior Publication Data

US 2005/0071618 A1    Mar. 31, 2005

Related U.S. Application Data

(63) Continuation-in-part of application No. 10/674,983, filed on Sep. 30, 2003, now Pat. No. 7,103,767.

(51) Int. Cl.
*G06F 9/00* (2006.01)
*G06F 15/177* (2006.01)
*G06F 13/00* (2006.01)

(52) U.S. Cl. ............................ 713/1; 713/2; 711/173

(58) Field of Classification Search .................... None
See application file for complete search history.

(56) References Cited

U.S. PATENT DOCUMENTS 6,192,456 B1 * 2/2001 Lin et al. ................... 711/173
2003/0172228 A1 * 9/2003 Chu et al. .................. 711/112

OTHER PUBLICATIONS

Intel, "Extensible Firmware Interface Specification," Dec. 1, 2002, pp. i-6-8, V1.10, Intel, USA.

* cited by examiner

*Primary Examiner*—Rehana Perveen
*Assistant Examiner*—Stefan Stoynov
(74) *Attorney, Agent, or Firm*—Blakely, Sokoloff, Taylor & Zafman LLP

(57) ABSTRACT

Disclosed is a method, apparatus, and system in which a basic input/output BIOS is run and a non-volatile memory coupled to the BIOS is read. The BIOS determines if legacy partition address data is not present for a disk partition identified in the non-volatile memory, and if legacy partition address data is not present for the disk partition, legacy partition address data may be obtained by a legacy OPROM. The disk drive may then be updated with the legacy partition address data.

27 Claims, 5 Drawing Sheets

METHOD AND APPARATUS TO SUPPORT LEGACY MASTER BOOT RECORD (MBR) PARTITIONS

This Application is a Continuation-in-Part of U.S. Ser. No. 10/674,983 filed on Sep. 30, 2003 now U.S. Pat. No. 7,103,767.

BACKGROUND

1. Field of the Invention

Embodiments of the invention relate generally to the field of computing systems, and more particularly, to a method and apparatus to support legacy master boot record (MBR) partitions in a storage device.

2. Description of Related Art

By the use of interface device cards, today's computer systems are increasingly capable of supporting more technologically advanced input/output (I/O) devices, as well as a greater number of I/O devices. An interface device card may be utilized to couple the rest of the computer system to one or more I/O devices. Examples of these I/O devices include, but are not limited to, storage devices such as hard disk drives, floppy disk drives, Compact Disk Read Only Memory (CD ROM) drives, Digital Video Disk (DVD) drives, as well as monitors, keypads, modems, printers, etc. The interface device cards that support these I/O devices, as well as other types of devices, often support newer firmware interface standards as well as legacy standards. In order to support these standards, the interface device cards typically have Extensible Firmware Interface (EFI) Option ROM (OPROM) and/or Legacy OPROM.

OPROM is typically firmware in the interface device card that is used to control a bootable peripheral I/O device. More particularly, OPROM includes pre-boot code that initializes a hardware device (e.g. an I/O device) that can be added to the computer system via the interface device card. The OPROM includes code to utilize the device.

Legacy OPROM is based on the original International Business Machine® (IBM) personal computer (PC)-Advanced Technology (AT) architecture, which is somewhat limited in its capabilities. For example, Legacy OPROM executes in 16-bit mode. On the other hand, newer firmware interface standards, implemented in EFI OPROM, have advantages over legacy OPROM, such as being faster, more reliable, etc.

In the case where a peripheral I/O device is a storage device, such as a disk drive, two different schemes are typically used for addressing individual blocks of data on a disk of the disk drive. When Legacy Operating Systems (OSs) are utilized, which in turn utilize the Legacy OPROM of the interface device, a legacy Cylinder, Head, Sector (CHS) scheme is used. In the CHS scheme, a block of data can be identified and addressed by the starting and ending cylinder (C), head (H) of the disk drive, and Sector (S). The CHS scheme is an older scheme of disk access and as technology advances is being replaced by a second simpler Logical Block Addressing (LBA) scheme.

In contrast, the LBA scheme uses a flat numbering scheme. The LBA scheme is typically used by newer firmware interfaces using EFI OPROM of the interface device card. For example, the LBA scheme is a method used with small computer system interface (SCSI) disk drives and is also used with newer operating systems. Both of these two different schemes are typically used for addressing individual blocks of data on a disk of a hard disk drive.

For example, typically on the first sector of the disk of a hard disk drive, a data structure known as the master boot record (MBR) is present. The MBR is created when the disk is initially partitioned and is updated thereafter to reflect new disk partitions. Also, the MBR is executed when a computer boots up. When the MBR is executed it begins the boot process by looking at a partition table to determine which partition is to be used for booting. It then transfers program control to the boot sector of that partition, which continues the boot process.

The MBR contains a table of partitions and entries for each partition. Each partition has partition entries related to the address and size of the particular partition, as well as other data. Each partition may have data fields related to legacy CHS partition data and LBA partition data. Thus, for each partition entry, the partition entry may have data in the CHS scheme and/or the LBA scheme.

Accordingly, Legacy boot code associated with a Legacy operating system can utilize the particular Legacy partition address data (i.e. CHS data) to find and load the boot sector of the active partition and non-Legacy boot code (e.g. associated with a device under the control of an interface device using a newer EFI standard) may utilize the LBA addressing scheme to use the particular LBA partition address data to find and load the boot sector of the active partition.

However, when an EFI partition utility creates a partition on the disk it will only fill in the known fields in the EFI partition address data field of the MBR of the disk for the particular partition. Particularly, it will only fill in the LBA address partition data for the particular partition. The LBA address is known since the EFI software interfaces are based on LBA. Unfortunately, the CHS fields (i.e. the legacy CHS partition data) are unknown and will be left blank for that particular partition.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Figure 1:
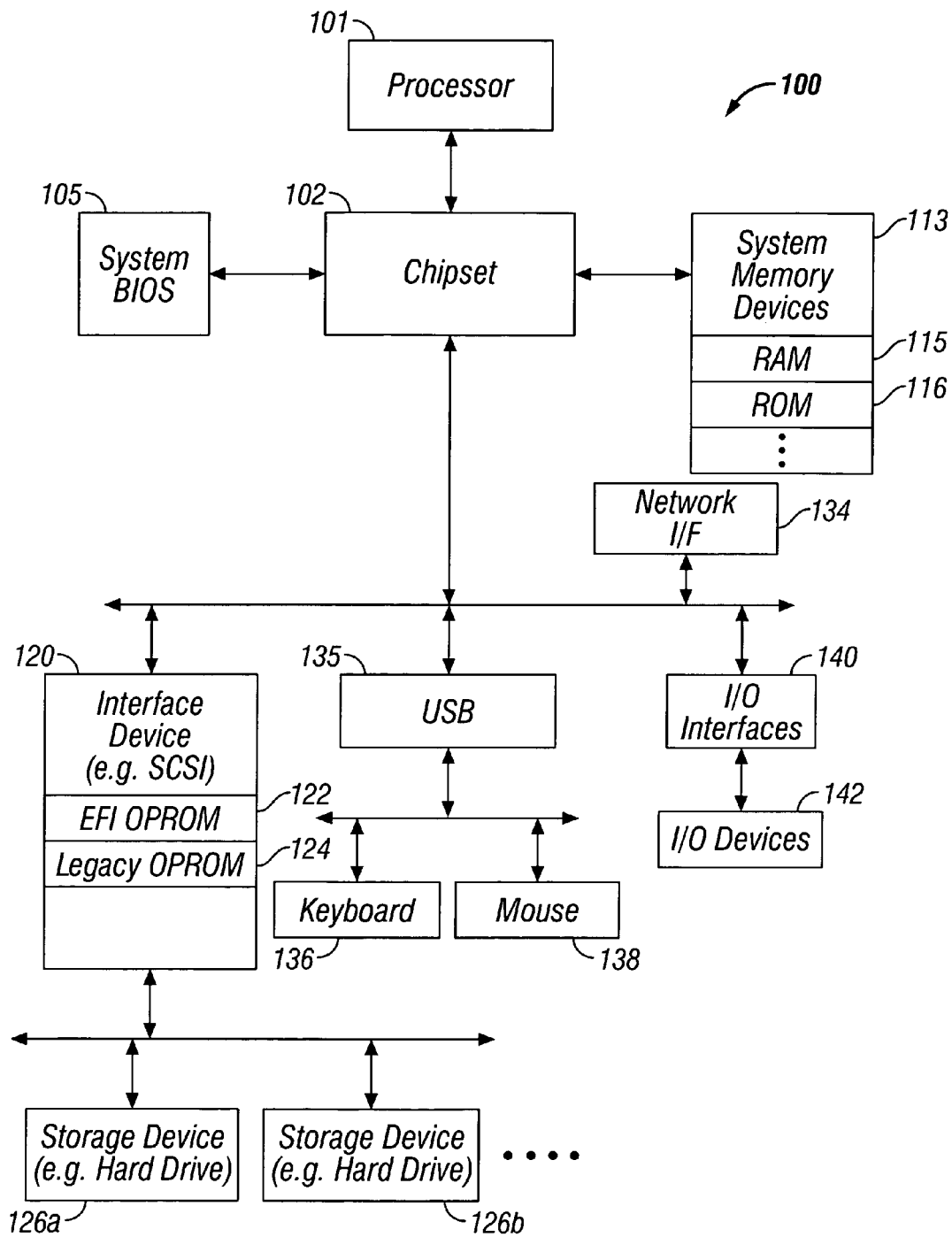
FIG. 1 shows a block diagram of an illustrative embodiment of an exemplary system configuration in which embodiments of the invention can be practiced.

With reference to FIG. 1, FIG. 1 shows a block diagram of an illustrative embodiment of an exemplary system configuration 100 in which embodiments of the invention can be practiced. The system configuration 100 includes at least one processor 101 such as a central processing unit (CPU), a chipset 102 which may include a memory control hub (MCH) and an Input/Output (I/O) control hub (ICH), a basic input/output system (BIOS) 105 that may be coupled to chipset 102, system memory devices 113, one or more interface devices 120, a network interface 134, a Universal Serial Bus (USB) interface 135, and other I/O interfaces 140. The system 100 may be any type of computing system. For example, the system 100 may be a server computer, personal computer, network computer, mainframe, hand-held device, etc.

For the purposes of the present specification, the term "processor" refers to any machine that is capable of executing a sequence of instructions and shall be taken to include, but not be limited to, general purpose microprocessors, special purpose microprocessors, application specific integrated circuits (ASIC), multi-media controllers, signal processors and microcontrollers, etc. In one embodiment, the CPU 101 is a general-purpose microprocessor that is capable of executing an Intel® Architecture instruction set. For example, the CPU 101 can be one of the PENTIUM classes of processors, one of the CELERON classes of processors, or one of the ITANIUM classes of processors.

The CPU 101 may be coupled to the chipset 102 by a front-side bus (FSB). As previously discussed, in one example, the chipset 102 may include an MCH and an ICH, which are coupled to one another. The MCH may be responsible for servicing memory transactions that target the system memory devices 113. The MCH can be a stand-alone unit, an integrated part of a chipset, or a part of some larger unit that controls the interfaces between various system components and the system memory devices 113.

The system memory devices 113 can include any memory device adapted to store digital information, such as random access memory (RAM) 115 and read-only memory (ROM) 116. Examples of RAM include static random access memory (SRAM), dynamic random access memory (DRAM), synchronous dynamic random access memory (SDRAM), and double data rate (DDR) SDRAM or DRAM, etc. System memory devices 113 can also include non-volatile memory such as read-only memory (ROM) 116.

In one example, an ICH of the chipset 102 may provide interface control between the MCH and various I/O devices and ports such as peripheral component interconnect (PCI) slots and PCI agents via a PCI bus. Examples of such interfaces include a network interface 134 to interface the system 100 to a network (not shown), at least one USB port 135 that may be utilized to support USB devices such as a USB keyboard 136 and a USB mouse 138, and one or more other I/O interfaces to support various other types of I/O devices 142. I/O devices 142 include any I/O device to perform I/O functions. For example, I/O devices may include a monitor, a keypad, a modem, a printer, storage devices (e.g. Compact Disk ROM (CD ROM), Digital Video Disk (DVD), hard drive, floppy drive, etc.) or any other types of I/O devices, e.g., input devices (mouse, trackball, pointing device), media cards (e.g. audio, video, graphics), etc.

An interface device 120 having Extensible Firmware Interface (EFI) Option ROM (OPROM) 122 and Legacy OPROM 124 may be utilized. Particularly, an interface device card 120 may be utilized to couple the rest of the system 100 to one or more devices. OPROM is typically firmware in an interface device card that is used to control bootable peripheral I/O devices. More particularly, OPROM includes pre-boot code that initializes hardware that can be added to the system 100 via an interface device card. Legacy OPROM 124 is based on the original IBM® PC-AT architecture and is somewhat limited in its capabilities. For example, Legacy OPROM 124 executes in 16-bit mode.

On the other hand, the EFI OPROM 122 has advantages over Legacy OPROM 124, such as being faster, more reliable, etc. In one embodiment, the EFI OPROM may be compatible with Intel's Extensible Firmware Interface Standard (Extensible Firmware Interface Specification, Version 1.10, published Dec. 1, 2002) to provide an EFI interface, which likewise has many advantages over the Legacy standard. Whether Legacy OPROM or EFI OPROM is utilized, the system BIOS 105 typically interrogates the OPROM(s) to determine which devices can be booted.

In one example, the interface device 120 may be a small computer system interface (SCSI) card. As is known, SCSI is a high-speed parallel interface standard to couple one or more devices to a computer system. Thus, coupled to the interface device may be one or more I/O devices, such as storage devices 126a,b, etc. For example, one of the storage devices 126 may be a hard drive. It should be appreciated that any sort of I/O device can be coupled through the interface device 120 to the rest of the system 100.

When a SCSI interface device card 120 is utilized using Legacy OPROM 124, the Legacy OPROM will initialize the SCSI hard drive 126 and provide Legacy INT 13 services that allow the rest of the system to access the SCSI hard drive 126. As is known, INT 13 is a DOS interrupt used to activate disk functions such as seek, read, write, format, etc. Similarly, when a SCSI interface device card 120 is utilized using EFI OPROM 122, the EFI OPROM will likewise initialize the SCSI hard drive 126 to allow the rest of the system to access the SCSI hard drive.

It should be appreciated that the FIG. 1 system configuration 100 is only an exemplary illustration of an environment in which embodiments of the invention can be practiced. Further, those skilled in the art will recognize that the exemplary environment illustrated in FIG. 1 is not intended to limit the embodiments of the invention.

Figures 2A, 2B:
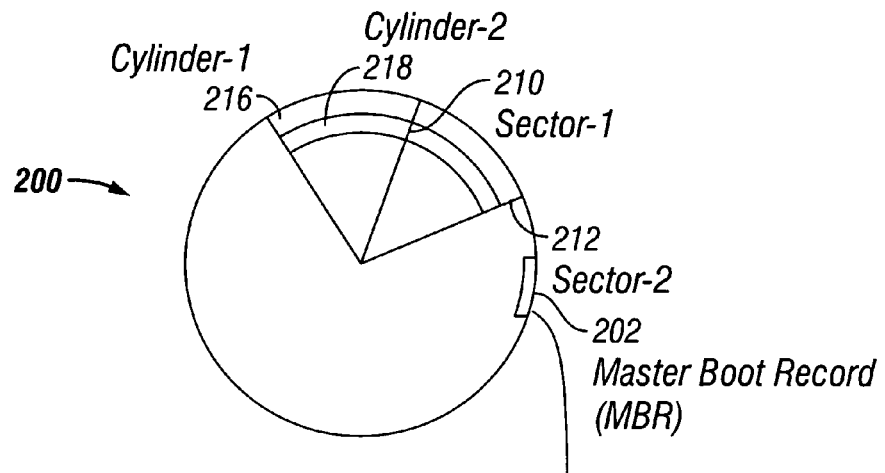
FIG. 2A is a diagram showing an example of one way in which data may be configured on a disk of a hard disk drive.
FIG. 2B illustrates an example of a partition table of a master boot record (MBR) of a disk.

Turning now to FIG. 2A, FIG. 2A is a diagram showing an example of one way in which data may be configured on a disk 200 of a disk drive, such as a hard disk drive 126. As shown in FIG. 2A, a disk 200 may be divided into multiple sectors (e.g. sector-1 210, sector-2 212, etc.) and multiple cylinders (e.g. cylinder-1 216, cylinder-2 218, etc.). Sometimes the term track is used instead of the term cylinder.

Two different schemes are typically used for addressing individual blocks of data on a disk 200 of a disk drive. These are the CHS scheme and the Logical Block Addressing (LBA) scheme. In the first scheme, the CHS scheme, the block address for the data to be addressed is represented in terms of three numbers C (Cylinder), H (Head) and S (Sector). In the CHS scheme, a block of data can be identified by the starting and ending cylinder (C), head (H) of the disk drive, and sector (S). The CHS scheme is an older scheme of disk access and as technology advances is being replaced by the simpler LBA scheme.

In contrast, the second LBA scheme uses a flat numbering scheme. The LBA scheme is a method used with SCSI and IDE disk drives to translate the CHS specifications of the drive into addresses that can be used by an enhanced Basic I/O System (BIOS). These two different schemes are typically used for addressing individual blocks of data on a disk 200 of a hard disk drive.

Also, as shown in FIG. 2A, typically on the first sector of the disk 200 is a data structure known as the master boot record (MBR) 202. The MBR is created when the disk 200 is partitioned. The MBR is executed when a computer boots up. When the MBR is executed it begins the boot process by looking at a partition table to determine which partition is to be used for booting. It then transfers program control to the boot sector of that partition, which continues the boot process. The MBR contains a table of partitions and entries for each partition. Each partition has partition entries related to the address and size of the particular partition, as well as other data.

Turning to FIG. 2B, FIG. 2B illustrates an example of a partition table 220 of an MBR 202 of a disk 200. As shown in FIG. 2B, the partition table 220 includes a plurality of partition entries 228a, 228b, 228c, etc. for each partition (e.g. partition-1, partition-2, partition-3, etc.) on the disk. Associated with each partition entry, is Legacy (CHS) partition data 238a, 238b, 238c, etc. for each partition (e.g. CHS-1, CHS-2, CHS-3, etc.) and LBA partition data 248a, 248b, 248c, etc., for each partition (e.g. LBA-1, LBA-2, LBA-3, etc.). Thus, for each partition entry, the partition entry has corresponding data in the CHS scheme and the LBA scheme to represent the address and size of the partition in each particular scheme, respectively. Accordingly, Legacy boot code can utilize the particular Legacy partition data to find and load the boot sector of the active partition and non-Legacy boot code that utilizes the LBA addressing scheme can use the particular LBA partition data to find and load the boot sector of the active partition. It should be noted that most modern operating systems (OSs) and firmware interfaces use the LBA fields, but still maintain CHS fields for backwards compatibility.

Figure 3:
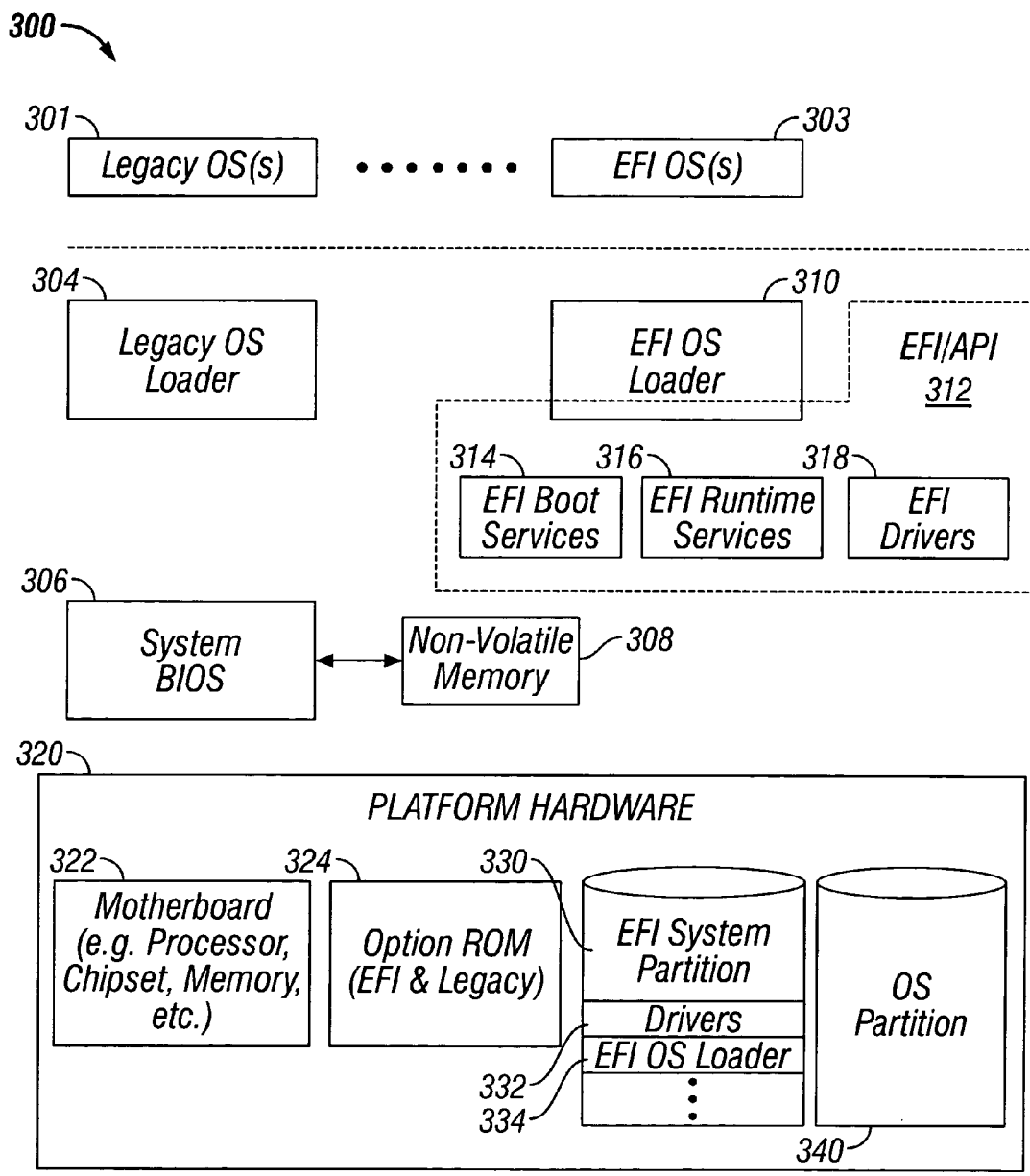
FIG. 3 is a block diagram illustrating an overview of the principle components of an Extensible Firmware Interface (EFI) in a computer system and its relation to platform hardware and OS software, according to one embodiment of the invention.

With reference now to FIG. 3, FIG. 3 is a block diagram illustrating an overview of the principal components of an Extensible firmware interface (EFI) in a computer system and its relation to platform hardware and OS software, according to one embodiment of the invention. FIG. 3 illustrates the various components that are used to accomplish OS boot and EFI OS boot. The firmware interface provides an interface between the operating system and the platform firmware of a computer system. Particularly, the interface may be in the form of data tables that contain platform-related information, and boot and run-time service calls that are available to the OS loader and the OS. Together, these provide a standard environment for booting both a standard OS and an EFI OS. The OS and the platform firmware communicate information necessary to support the OS boot process. In this way, firmware associated with an interface device can be seamlessly integrated with a computer system to add new hardware to the system.

In one example the EFI may be in accordance with Intel®'s Extensible Firmware Interface Specification (Extensible Firmware Interface Specification, version 1.10, published Dec. 1, 2002).

As shown in FIG. 3, the system 300 may include a plurality of operating systems (OS(s)) including one or more Legacy-based OSs 301 and one or more EFI-based operating systems OSs 303. The system may further include a Legacy OS loader 304 and an EFI OS loader 310. The system also includes a basic input/output system (BIOS) 306, which may be coupled to a non-volatile memory 308, such as a flash memory. Further, an EFI application program interface (API) 312 including EFI boot services 314, EFI run-time services 316, and EFI drivers 318 may be utilized to provide the requisite functionality to operate an interface device associated with the EFI.

Platform hardware 320 may include a motherboard 322 for the computer system. For example, this may include a processor 101, a chipset 102, system memory devices 113, etc. (FIG. 1). Platform hardware 320 may further include Option ROM (OPROM) 324. Particularly, this may include EFI OPROM and Legacy OPROM. In one example, as discussed with reference to FIG. 1, EFI OPROM 122 and Legacy OPROM 124 may be present in interface device 120, such as a SCSI interface device card. Also, non-volatile memory 308 may be separate non-volatile memory or may be part of system memory devices 113.

Platform hardware 320 also includes one or more storage devices, such as a hard disk drive 126 as previously discussed with reference to FIG. 1. A storage device of platform hardware 320 may include at least one OS partition 340 and at least one EFI system partition 330 if the platform includes an EFI OS. Included within the EFI system partition are drivers 332 and an EFI OS loader 334. For example, the previously described configuration allows firmware for a device, such as a SCSI interface device card 120, to be seamlessly integrated with the rest of the system to enable the use of a device, such as a hard disk drive, to be used with the system.

When an EFI application 312 creates an MBR disk partition, it typically does so utilizing only the LBA addressing scheme and only fills in LBA partition address data for the partition and not Legacy CHS partition address data for the partition. However, it would be beneficial for the Legacy operating system 302, which can only read and understand Legacy CHS address data, to be able to read the appropriate CHS fields for the EFI system partition 330.

The platform hardware 320 typically includes EFI OPROM and Legacy OPROM 324. Continuing with our previous example, a SCSI interface device card 120 may include EFI OPROM 122 and Legacy OPROM 124 to control a hard disk drive 126. The system BIOS 306 will typically run one of the two OPROM during the boot process to boot the interface device card 120. The legacy OPROM is run before booting legacy Operating System, whereas the EFI OPROM will be run before booting an EFI Operating System or EFI shell. If the Legacy OPROM is run, the Legacy OPROM can be queried to find out the mapping it uses.

However, EFI OPROM typically does not utilize the CHS addressing scheme, but rather uses the LBA addressing scheme. Thus, the CHS mapping information is not available to an EFI Operating System or EFI shell.

Particularly, when an EFI partition utility running under EFI Operating System or EFI shell creates a partition on the disk, it will fill in the known fields in the EFI partition entry, in the MBR 202 of the disk 200 (FIG. 2). Particularly, it will fill in the LBA partition data 248 for the particular partition 228. The LBA address is known since the EFI software interfaces are based on the LBA. However, the CHS fields (e.g. Legacy CHS partition data 238) are left blank. The location of the EFI disk partition in LBA is communicated to the system BIOS 306. Also, the system BIOS 306 stores this information in non-volatile memory 308. When the EFI application 312 is done with the partitioning and the user wants to boot a legacy operating system, the user will reboot the system.

The system BIOS 306 will run the legacy OPROM this time since the legacy Operating System is being booted. Before booting a Legacy operating system 302, the system BIOS 306 reads the non-volatile memory 308 to find out if there are any disk partitions without CHS fields. If there are, the system BIOS 306 runs the Legacy OPROM 124 of the interface device 120 for the storage device 126. Once the Legacy OPROM 124 is run, the CHS mapping can be retrieved by the system BIOS 306 and the necessary partition entries can be updated with corresponding CHS values in both the non-volatile memory 308 and in the storage device (e.g. a hard disk drive 126) itself. For example, Legacy CHS partition data 238 of the partition table 220 of the MBR 202 of the disk 200 can be updated under the control of system BIOS 306. The Legacy OS 302 can now understand the partition entries in both the non-volatile memory 308 and the disk 200.

Figure 4:
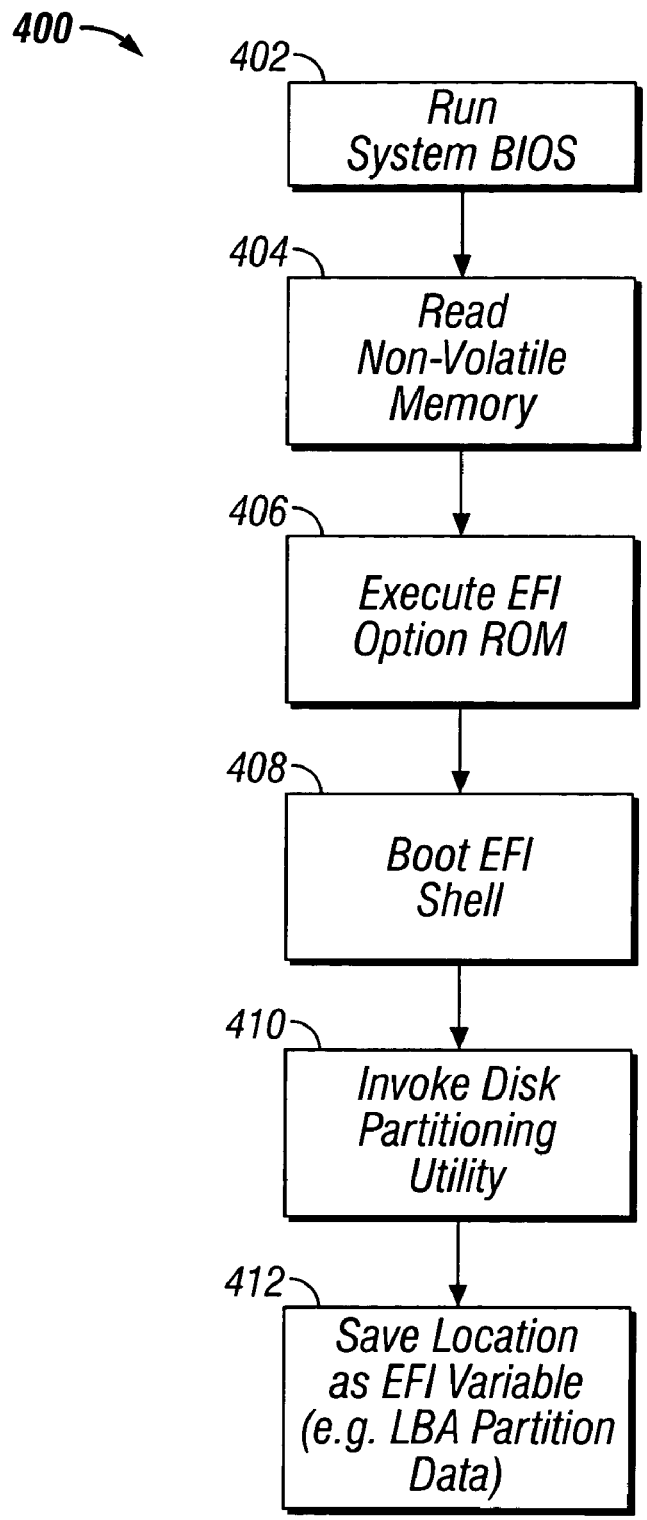
FIG. 4 illustrates an example of a process to implement an EFI partitioning, according to one embodiment of the present invention.

Turning now to FIG. 4, FIG. 4 illustrates an example of a process 400 to implement an EFI partitioning. At block 402 the system BIOS 306 is run. The non-volatile memory 308 is read (block 404). Next, the EFI OPROM is executed (block 406). The EFI shell is booted at block 408 and at block 410 the disk partitioning utility is invoked. After the disk partitioning, wherein partitioning data related to the address and size of the EFI system partition 330 is created and saved in the MBR in accordance with the LBA partitioning scheme (as previously discussed), this LBA partition data is also saved in non-volatile memory 308 as an EFI variable for access by system BIOS 306 (block 412).

Figure 5:
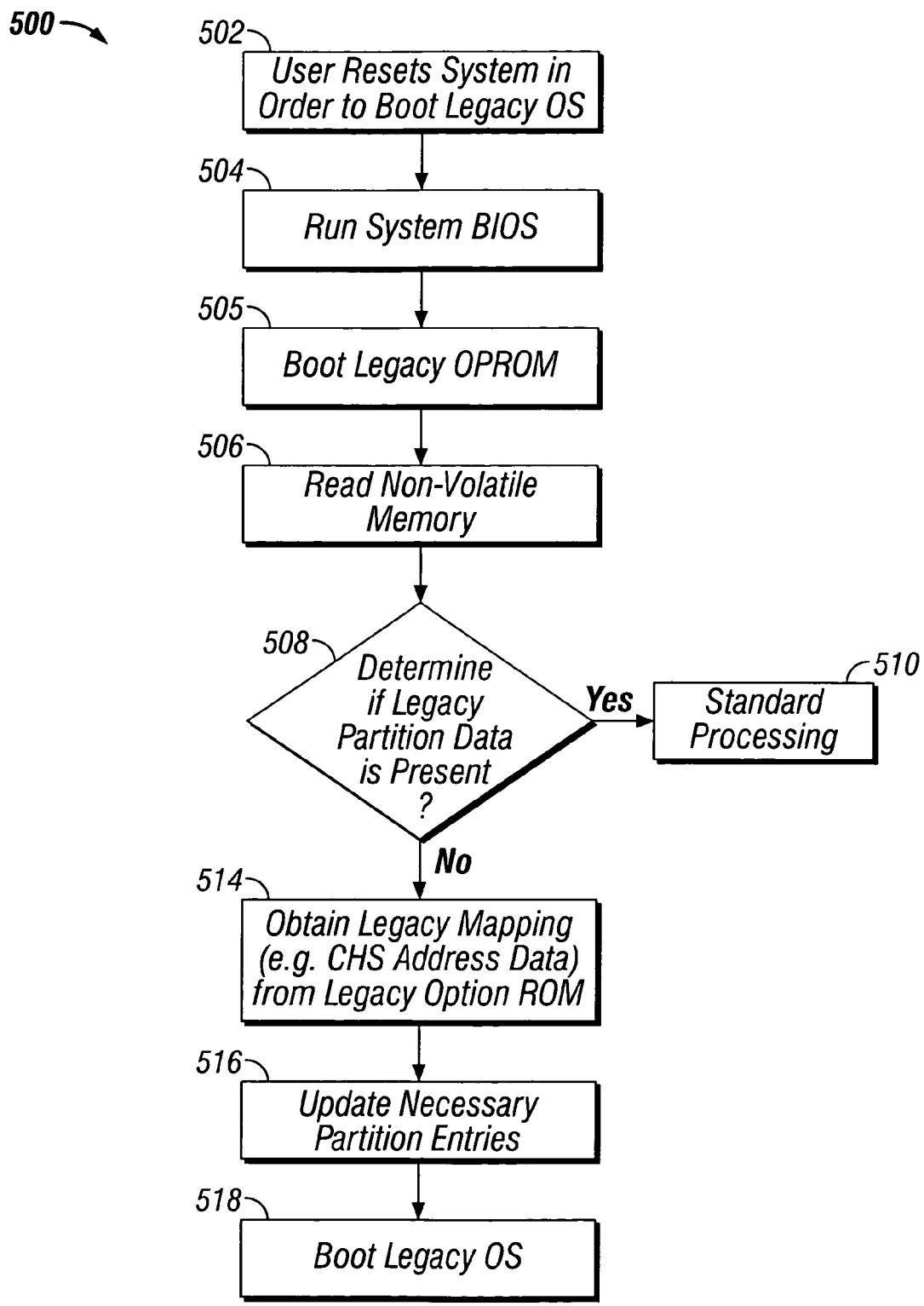
FIG. 5 illustrates a process to support Legacy MBR partitions for use by Legacy operating systems (OSs), according to one embodiment of the present invention.

With reference now to FIG. 5, FIG. 5 illustrates a process 500 to support legacy MBR partitions for Legacy operating systems (OSs), according to one embodiment of the present invention. It should be noted that the CHS fields can be left blank as long as EFI OS or EFI shell is the boot selection. However, these need to be filled in prior to booting a legacy Operating System.

First, the user resets the system in order to boot a legacy Operating System (block 502). The system BIOS is executed after this reset. At block 504, the system BIOS 306 is run. Since the legacy Operating System is to be booted, the legacy OPROMs are booted or executed (block 505). The non-volatile memory 308 is read by the system BIOS 306 (block 506). Then, at block 508, the process 500 under the control of the system BIOS 306 determines whether Legacy partition data (e.g. CHS data) is present for all of the disk partitions recorded in non-volatile memory. If CHS data for all the partitions is already present, then standard processing proceeds (block 510).

However, if Legacy partition data (e.g. CHS data) does not exist for a particular partition, legacy mapping data (e.g. CHS address data) is obtained from the Legacy OPROM for the partition such that the partition data utilizing the CHS addressing scheme is available for the partition (block 514).

Further, at block 516, the necessary partition entries on the disk itself are updated. For example, looking at FIG. 2B, for the particular partition entry 228, the corresponding Legacy CHS partition address data 238 is filled in such that both Legacy (e.g. CHS) partition address data 238 and LBA partition address data 248 are present for the partition. The Legacy OS is now booted. In this way, the Legacy OS may be able to read and understand the appropriate CHS address fields for an EFI partition. Functional blocks 506 through 516, previously discussed, may be executed under control of the system BIOS 306.

It should be appreciated by those of skill in this art, that although the embodiments of the present invention have been illustrated utilizing as an example a SCSI interface card and a hard disk drive utilizing a disk having partition data, that embodiments of the invention can be utilized with any sort of interface device and device coupled thereto.

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof.

When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A method comprising:
running a basic input/output system (BIOS) of a computing system;
booting a Legacy option read only memory (OPROM); and
determining if legacy partition address data is not present for a disk partition identified in a non-volatile memory, and if legacy partition address data is not present for the disk partition, then legacy partition address data for the disk partition that does not have associated legacy partition address data is obtained from the legacy OPROM, otherwise, if legacy partition address data is present for all of the disk partitions in the non-volatile memory, then standard processing occurs.

2. The method of claim 1, further comprising, updating a partition entry of a disk drive with the legacy partition address data.

3. The method of claim 2, wherein the disk drive is a hard disk drive.

4. The method of claim 3, wherein the legacy partition address data is address data compatible with a cylinder, head, sector (CHS) scheme.

5. The method of claim 3, wherein the updated partition entry is part of a master boot record (MBR) of the hard disk drive.

6. The method of claim 1, wherein the disk partition identified in the non-volatile memory that does not include legacy partition address data does include non-legacy address partition data.

7. The method of claim 6, wherein the non-legacy address partition data is address data compatible with a logical block addressing (LBA) scheme.

8. An apparatus comprising:
a basic input/output system (BIOS);
a non-volatile memory coupled to the BIOS; and
Legacy option read only memory (OPROM);
wherein the BIOS determines if legacy partition address data is not present for a disk partition in the non-volatile memory, and if legacy partition address data is not present for the disk partition, then legacy partition address data for the disk partition that does not have associated legacy partition address data is obtained from the legacy OPROM, otherwise, if legacy partition address data is present for all of the disk partitions in the non-volatile memory, then standard processing occurs.

9. The apparatus of claim 8, wherein the BIOS updates a partition entry of a disk drive with the legacy partition address data.

10. The apparatus of claim 9, wherein the disk drive is a hard disk drive.

11. The apparatus of claim 10, wherein the legacy partition address data is address data compatible with a cylinder, head, sector (CHS) scheme.

12. The apparatus of claim 10, wherein the updated partition entry is part of a master boot record (MBR) of the hard disk drive.

13. The apparatus of claim 8, wherein the disk partition identified in the non-volatile memory that does not include legacy partition address data does include non-legacy address partition data.

14. The apparatus of claim 13, wherein the non-legacy address partition data is address data compatible with a logical block addressing (LBA) scheme.

15. A machine-readable storage medium having stored thereon instructions, which when executed by a machine, cause the machine to perform the following operations comprising:
running a basic input/output system (BIOS) of a computing system;
booting a Legacy option read only memory (OPROM); and
determining if legacy partition address data is not present for a disk partition identified in a non-volatile memory, and if legacy partition address data is not present for the disk partition, then legacy partition address data for the disk partition that does not have associated legacy partition address data is obtained from the legacy OPROM, otherwise, if legacy partition address data is present for all of the disk partitions in the non-volatile memory, then standard processing occurs.

16. The machine-readable storage medium of claim 15, further comprising, updating a partition entry of a disk drive with the legacy partition address data.

17. The machine-readable storage medium of claim 16, wherein the disk drive is a hard disk drive.

18. The machine-readable storage medium of claim 17, wherein the legacy partition address data is address data compatible with a cylinder, head, sector (CHS) scheme.

19. The machine-readable storage medium of claim 17, wherein the updated partition entry is part of a master boot record (MBR) of the hard disk drive.

20. The machine-readable storage medium of claim 15, wherein the disk partition identified in the non-volatile memory that does not include legacy partition address data does include non-legacy address partition data.

21. The machine-readable storage medium of claim 20, wherein the non-legacy address partition data is address data compatible with a logical block addressing (LBA) scheme.

22. A system comprising:
a basic input/output system (BIOS);
a non-volatile memory coupled to the BIOS; and
Legacy option read only memory (OPROM);
a hard disk drive having a master boot record (MBR) coupled to the BIOS;
wherein the BIOS determines if legacy partition address data is not present for a disk partition in the non-volatile memory, and if legacy partition address data is not present for the disk partition, then legacy partition address data for the disk partition that does not have associated legacy partition address data is obtained from the legacy OPROM, otherwise, if legacy partition address data is present for all of the disk partitions in the non-volatile memory, then standard processing occurs.

23. The system of claim 22, wherein the BIOS updates a partition entry of a hard disk drive with the legacy partition address data.

24. The system of claim 22, wherein the legacy partition address data is address data compatible with a cylinder, head, sector (CHS) scheme.

25. The system of claim 22, wherein the updated partition entry is part of a master boot record (MBR) of the hard disk drive.

26. The system of claim 22, wherein the disk partition identified in the non-volatile memory that does not include legacy partition address data does include non-legacy address partition data.

27. The system of claim 26, wherein the non-legacy address partition data is address data compatible with a logical block addressing (LBA) scheme.

* * * * *